(12) United States Patent
Fujikawa

(10) Patent No.: US 7,578,545 B2
(45) Date of Patent: Aug. 25, 2009

(54) BODY FRAME STRUCTURE FOR AN AUTOMOTIVE VEHICLE

(75) Inventor: Kazutoyo Fujikawa, Kanagawa (JP)

(73) Assignee: Nissan Motor Co. Ltd., Yokohama-shi, Kanagawa (JP)

( * ) Notice: Subject to any disclaimer, the term of this patent is extended or adjusted under 35 U.S.C. 154(b) by 267 days.

(21) Appl. No.: 10/572,171

(22) PCT Filed: Oct. 12, 2005

(86) PCT No.: PCT/IB2005/053358

§ 371 (c)(1),
(2), (4) Date: Mar. 28, 2007

(87) PCT Pub. No.: WO2006/040732

PCT Pub. Date: Apr. 20, 2006

(65) Prior Publication Data

US 2008/0272619 A1    Nov. 6, 2008

(30) Foreign Application Priority Data

Oct. 13, 2004  (JP) .............................. 2004-298673
Sep. 12, 2005  (JP) .............................. 2005-264095

(51) Int. Cl.
*B60J 7/00*  (2006.01)

(52) U.S. Cl. .......................... 296/187.09; 296/203.02; 296/187.08

(58) Field of Classification Search ............ 296/187.09, 296/203.02, 187.08
See application file for complete search history.

(56) References Cited

U.S. PATENT DOCUMENTS

| 2001/0022444 | A1 | 9/2001 | Lapic |
| 2004/0183338 | A1 | 9/2004 | Makita et al. |
| 2005/0189788 | A1 | 9/2005 | Cornell et al. |
| 2006/0028052 | A1* | 2/2006 | Dandekar et al. ...... 296/187.09 |

OTHER PUBLICATIONS

PCT International Search Report #PCT/IB2005/053358, dated Dec. 29, 2005.

* cited by examiner

*Primary Examiner*—Joseph D Pape
(74) *Attorney, Agent, or Firm*—Young Basile

(57) ABSTRACT

In a body frame structure for an automotive vehicle, the amount of the bending and deforming of a longitudinal frame member in the rear direction can be controlled and the amount of the collision energy absorption during a frontal collision can be increased. A kick-up portion that bends and deforms the front portion upwardly during the application of the collision load is provided between a front portion and a rear portion of the closed section of the longitudinal frame member, which extend in the longitudinal direction of the vehicle. A deformation guide member, which constrains the longitudinal frame member to bend and deform in the lateral direction of the vehicle at the front portion by colliding portions of the deformation guide member with each other due to the applied frontal collision load, is provided inside the closed section of the kick-up portion of the longitudinal frame members.

11 Claims, 15 Drawing Sheets

BODY FRAME STRUCTURE FOR AN AUTOMOTIVE VEHICLE

RELATED APPLICATIONS

The disclosure of Japanese Patent Application Nos. 2004-298673 (filed on Oct. 13, 2004) and 2005-264095 (filed on Sep. 12, 2005) including specification, drawings and claims is incorporated herein by reference in their entirety.

FIELD

A body frame structure for an automotive vehicle is disclosed, as is an energy absorption method using such a body frame structure.

BACKGROUND

In general, longitudinal frame members that extend in the longitudinal direction of a vehicle are provided on both sides of a front compartment in the lateral direction of a vehicle, that is disposed on a front portion of the vehicle body. For example, in a unitized body, a rear portion of a front side member, comprising the longitudinal frame members, extends in the rear direction and the frame members are offset (shifted) downwardly from kick-up portions (buckling points) relative to the front part. (See Laid Open Japanese Patent No. 2004-75021.)

When a collision load is applied to the front side member during a frontal collision of the vehicle, the front portions are bent and deformed upwardly around the kick-up portions, thereby absorbing the collision energy.

However, in the above-mentioned conventional body frame structure, the front portions of the longitudinal frame members are bent and deformed upwardly around the kick-up portion during a frontal collision, and therefore, in order to secure the predetermined amount of collision energy absorption, the bent deformation displacement of the front portions of the longitudinal frame members in the rear direction should be secured. The longitudinal dimension of the front compartment becomes longer, and consequently the auto body becomes longer.

SUMMARY

A body frame structure limits the bending displacement of the longitudinal frame members in the rear direction during a frontal collision is provided, whereby the absorption of the collision energy is increased.

The body frame structure has at least one longitudinal frame member having a closed section, wherein the front and rear portions are offset relative to each other in the vertical direction around a kick-up portion, and wherein the front portion is bent and deformed upwardly around the kick-up portion when a collision load is applied to the longitudinal frame member. At least one bent deforming guide member, which constrains the longitudinal frame member to bend and deform in the lateral direction of the vehicle at the front portion by collision of components of the guide member due to the applied frontal collision load, is located inside the closed section of the kick-up portion of the longitudinal frame member.

Also, in a collision energy absorbing method using a body frame structure, a vehicle including at least one longitudinal frame member having a closed section is provided so that front and rear portions are offset relative to each other in the vertical direction around the kick-up portion, in which the front portion is bent and deformed upwardly around the kick-up portion when a collision load is applied to the longitudinal frame member. At least one bent deforming guide member, which constrains the longitudinal frame member to bend and deform in the lateral direction of the vehicle at the front portion by collision of components of the guide members due to the applied frontal collision load, is located inside the closed section of the kick-up portion of the longitudinal frame members.

Further, in a body frame structure and energy absorbing method, the front portion of the longitudinal frame member is bent and deformed upwardly around the kick-up portion during a frontal collision, and then the front portion is bent and deformed in the lateral direction of the vehicle due to the collision of the bent deforming guide members. Therefore, by the addition of the bent deformation in the lateral direction of the vehicle, the bent deforming disposition of the front portion toward the rear can be limited, and at the same time the amount of collision energy absorption can be increased.

Thus, there are a number of advantages and there is no requirement that a claim be limited to encompass all of the advantages.

In addition, the foregoing has outlined rather broadly the features and technical advantages in order that the detailed description of the invention that follows may be better understood. Additional features and advantages will be described hereinafter that form the subject of the claims.

BRIEF DESCRIPTION OF THE DRAWINGS

For a more complete understanding, and the advantages thereof, reference is now made to the following description taken in conjunction with the accompanying drawings, in which.

DETAILED DESCRIPTION OF THE ILLUSTRATED EMBODIMENTS

A description will now be given, referring to embodiments thereof. While the claims are not limited to such embodiments, an appreciation of various aspects of the invention is best gained through a discussion of various examples thereof.

Figure 1:
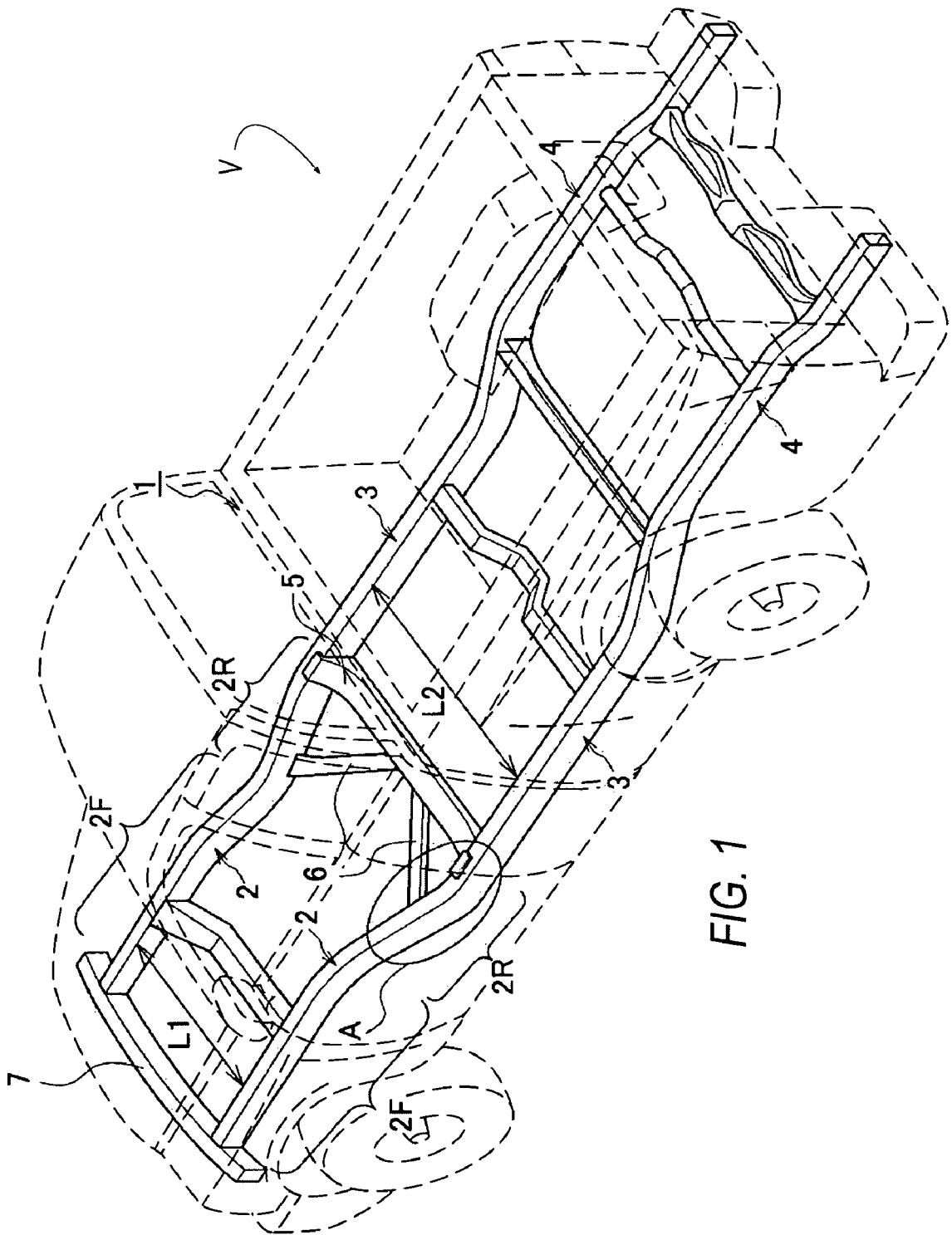
FIG. 1 is a perspective view from above, the rear, and one side of an automotive vehicle, shown in phantom outline and having a body frame structure according to an embodiment.

FIGS. 1 to 10 show a first embodiment. A body frame structure 1 for an automotive vehicle V according to the present embodiment is shown in FIG. 1. Front side rails 2 are provided as a pair of longitudinal frame members on the left and right sides of a front portion of the body frame structure 1, and the pair of front side rails 2 is located on both sides of a front compartment provided in the front portion of the auto body and are extended in the longitudinal direction of the vehicle.

Rear ends of the front side rails 2 continue to center side rails 3, respectively, which are positioned in both sides in the lateral direction of the vehicle in a compartment, and far rear ends thereof continue to the rear side rails 4. The transmission cross member 5 is connected between the rear ends of the left and right front side rails 2, and also a pair of left and right diagonal bars 6 is connected in a V-shape to the center portion of the vehicle of the transmission cross member 5 and to the front side rails 2 at both sides.

In addition, a bumper reinforcement member 7 that forms a front bumper frame is provided so as to bridge the front edges of the left and right front side rails 2.

The body frame structure 1 is such that, as shown in FIG. 1, a distance L2 between the left and right center side rails 3 is greater than a distance L1 between the front portions 2F of the left and right front side rails 2, and the rear portions 2R of the left and right front side rails 2 are inclined laterally outwardly toward the rear of the vehicle.

Figure 2:
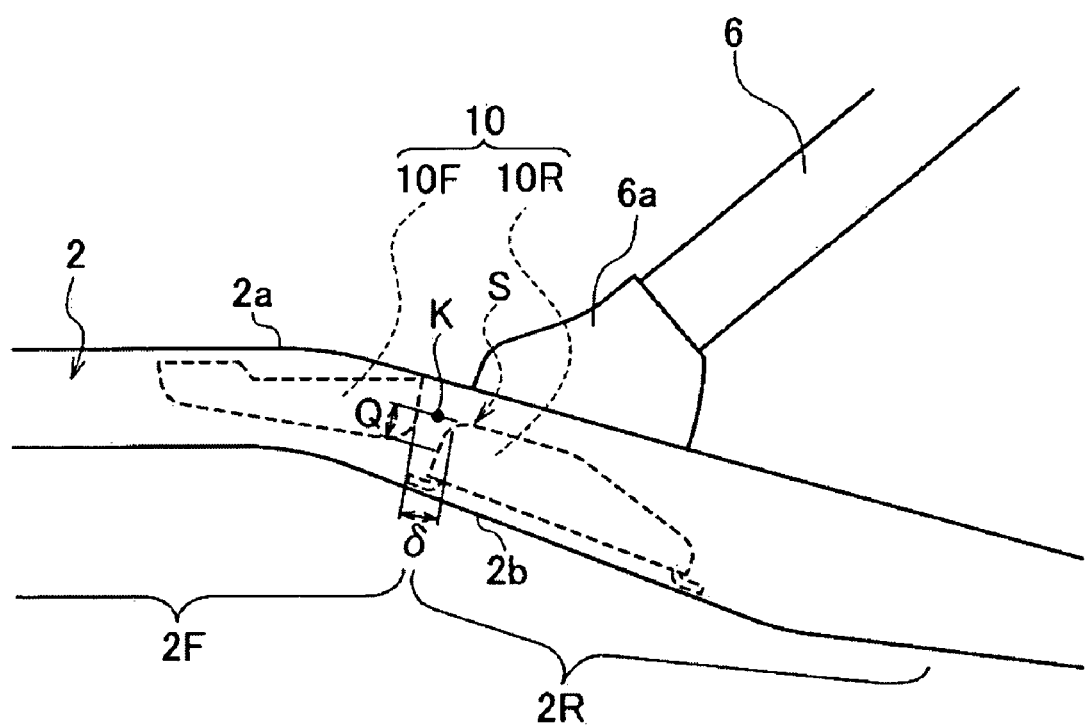
FIG. 2 is an enlarged plan view of a portion A of the body frame structure of FIG. 1.

In addition, at least one of the front side rails 2 is, as shown in FIG. 2, provided with a kick-up portion K between the respective front portion 2F and rear portion 2R. Front portion 2F and rear portion 2R are, as shown in FIG. 3, connected so as to be offset relative to each other in the vertical direction around the kick-up portion K as a border between them.

By providing the kick-up portion K, when a frontal collision load is applied from the front of the front side rail 2, the front portion 2F is bent and deformed upward around the kick-up portion K as a center point of deformation rotation.

In addition, a housing C is provided on the top surfaces of the front side rails 2. A floor panel 8 of the housing C is laid down from the rear portion 2R toward the rear. The front edge of this floor panel 8 stands up as a dash panel 9 so as to separate a compartment F/C and a vehicle interior R.

Figure 3:
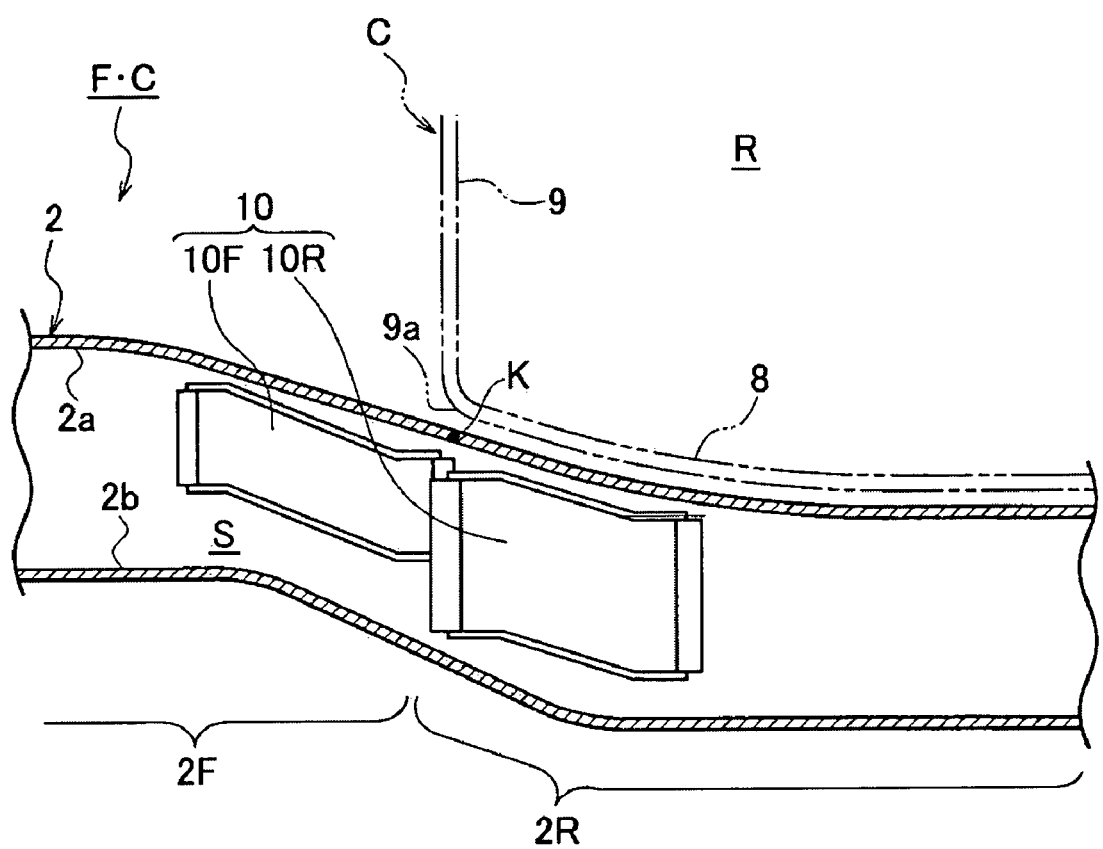
FIG. 3 is a cross-sectional view of the portion A of FIGS. 1 and 2.

Here, in the body frame structure as shown in FIGS. 2 and 3, a bent deformation guide member 10, which constrains bent deformation of the front portions 2F of the front side rails 2 in the lateral direction of the vehicle due to application of a frontal collision load, is provided inside a closed section S around the kick-up portion K of at least one of front side rails 2.

In the collision energy absorbing method, a bent deformation of the front portions 2F in the lateral direction of the vehicle is constrained by colliding parts of the bent deformation guide member 10 with each other during the application of the collision load.

Each of the bent deformation guide members 10 comprises a front guide member 10F and a rear guide member 10R. The front guide member 10F and the rear guide member 10R are provided adjacent to each other around a vertical wall position 9a of the dash panel 9, which is located approximately between these guide members 10F and 10R.

Figure 4:
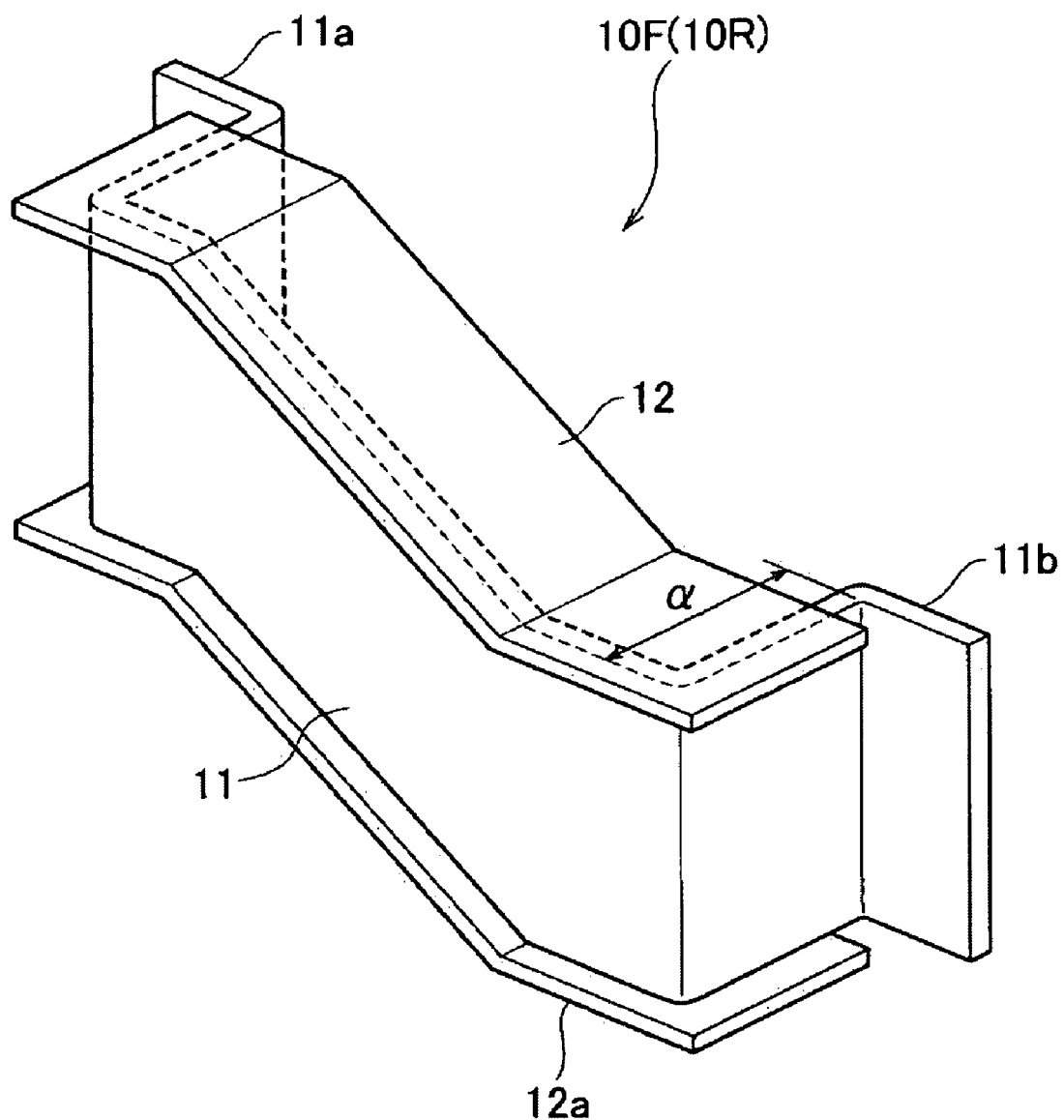
FIG. 4 is a perspective view of a bent deforming guide member according to an embodiment.

The front guide member 10F comprises, as shown in FIG. 4, a side wall 11 that is formed in a U-shape and projects a predetermined distance a from flanges 11a and 11b, which are provided on both ends thereof in the longitudinal direction, and a top seal plate 12 and a bottom seal plate 12a, which are provided so as to seal the top and bottom portions of the side wall 11, respectively.

In addition, the rear guide member 10R, similar to the front guide member 10F shown in FIG. 4, comprises flanges 11a and 11b, a side wall 11 and top and bottom seal plates 12 and 12a.

The bent deforming guide member 10 that comprises the front guide member 10F and the rear guide member 10R is provided such that, as shown in FIG. 2, the front guide member 10F and the rear guide member 10R are offset relative to each other on the inner wall 2a and outer wall 2b of the front side rail 2, respectively, so that the front portion 2F of the front side rail 2 is bent and deformed toward the inside of the vehicle in the lateral direction.

In other words, the front guide member 10F is provided with the flanges 11a and 11b (see FIG. 4) that are connected on the inner surface of the inner wall 2a of the front side rail 2 by spot welding, and the rear guide member 10R is provided with the flanges 11a and 11b that are connected on the inner surface of the outer wall 2b of the front side rail 2 by spot welding.

As shown in FIG. 2, the projected front side of the rear guide member 10F and the projected front side of the rear guide member 10R face each other at a predetermined distance δ in the longitudinal direction of the vehicle, and a predetermined overlapping of portions Q are provided in the lateral direction of the vehicle.

Furthermore, in the present embodiment, the front edge 6a of the diagonal bar 6 is connected to a portion where the rear guide member 10R of at least one of the front side rails 2 is provided, namely, on an inner surface that corresponds to the rear guide member 10R of the outer wall 2b of the front side rail 2.

Figure 5:
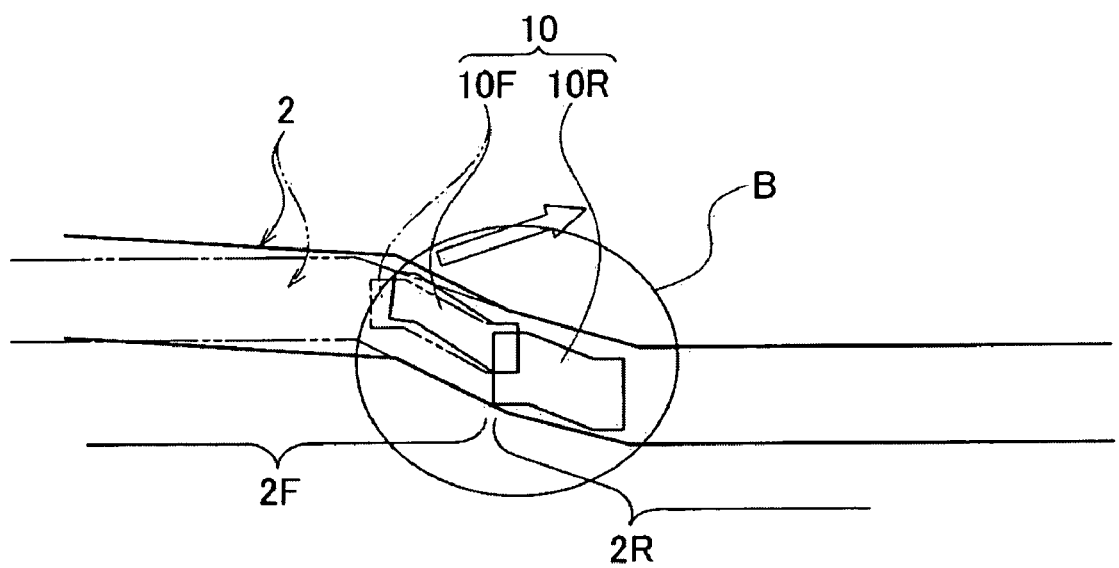
FIG. 5 is a side view of the bent deforming guide member of FIG. 4 in operation during an initial period of a collision load application.
Figure 6:
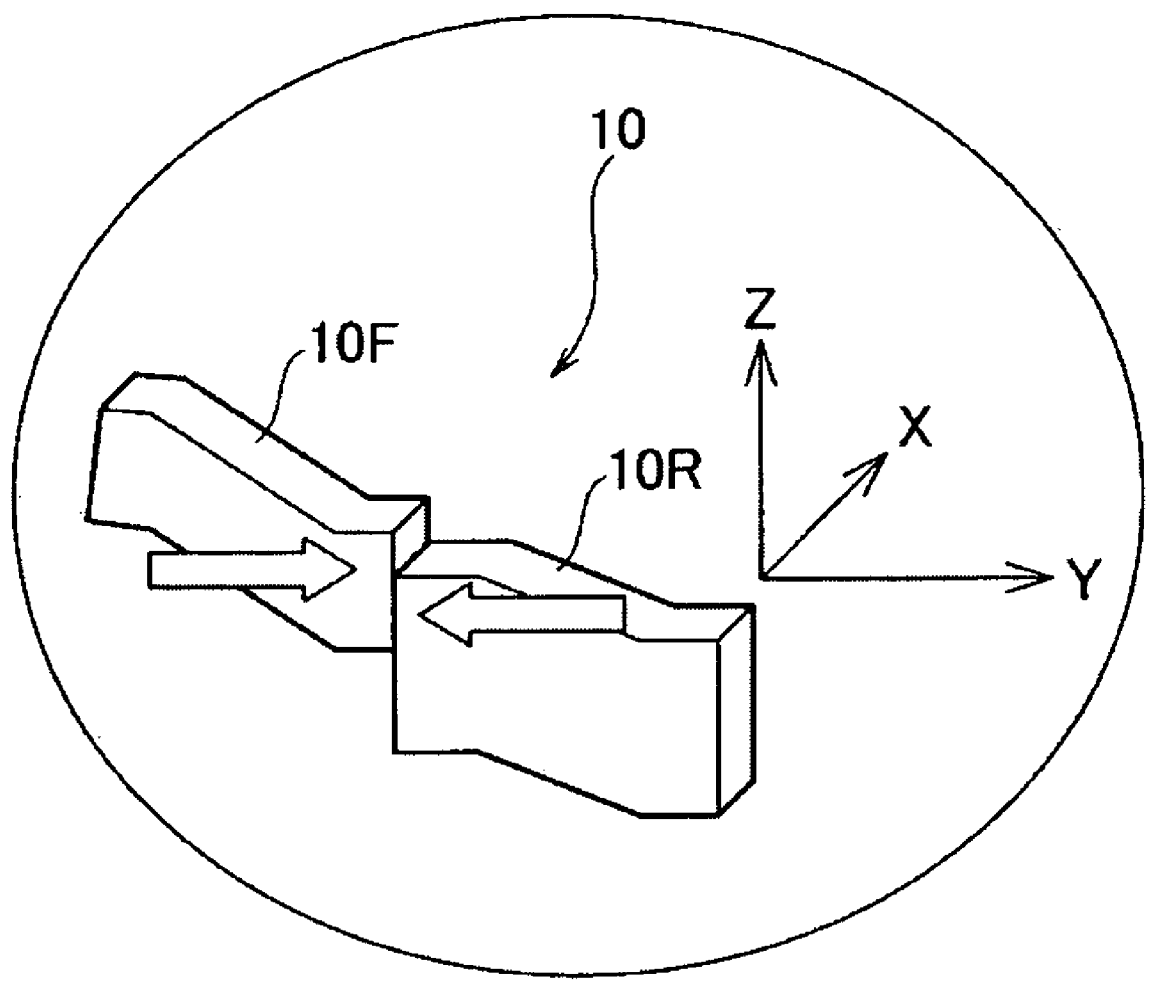
FIG. 6 is an enlarged perspective view of a portion B of FIG. 5.

In the above-mentioned structure, in accordance with the present embodiment, during a frontal collision of the vehicle, the collision load is applied from a bumper reinforcement member 7 to the front side rails 2 as a load in the axial direction. Then, the front part 2F of the front side rail 2 is bent and deformed upwardly by centering around the kick-up portion K, and therefore a buckling is generated at the kick-up portion K. Consequently, as shown in FIGS. 5 and 6, the rear end of the front guide member 10F of the bent deforming guide member 10 is displaced toward the rear thereby interfering with the front edge of the rear guide member 10R.

Figure 7:
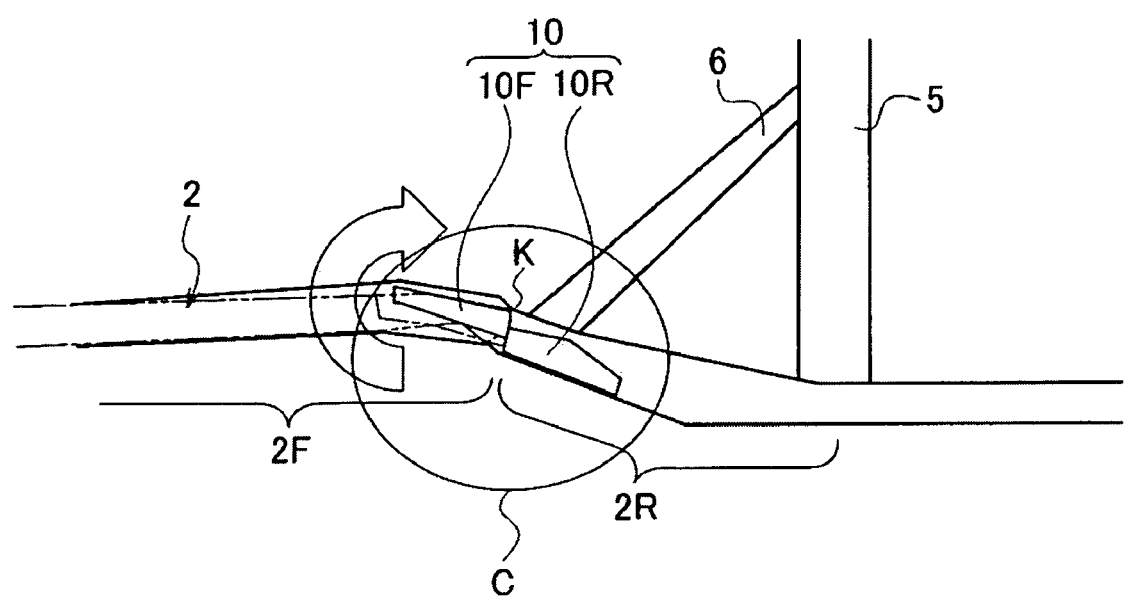
FIG. 7 is a side view of the bent deforming guide member of FIGS. 4 to 6 during an intermediate period of a collision load application.
Figure 8:
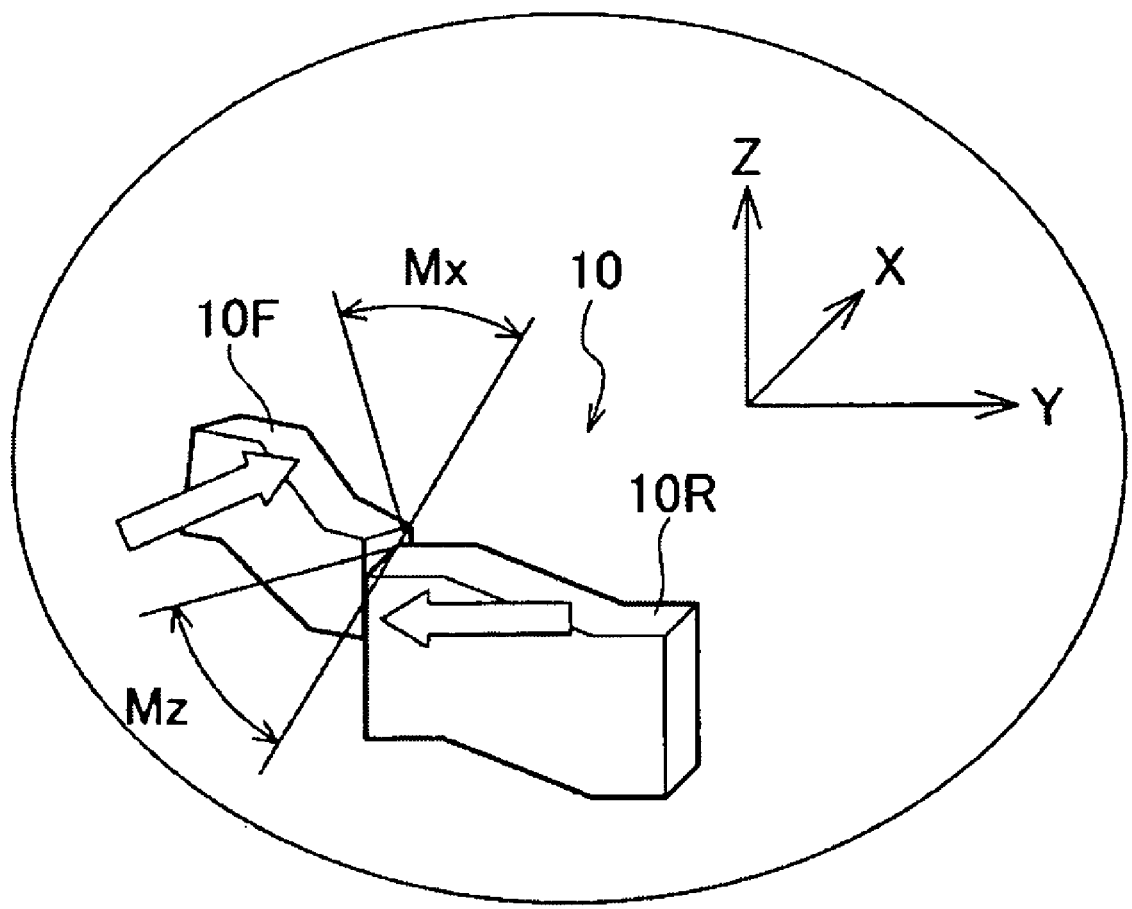
FIG. 8 is an enlarged perspective view of a portion C of FIG. 7.

Then, the collision load that is applied to the front portion 2F is retained by the rear guide member 10R via the front guide member 10F, and therefore, as shown in FIGS. 7 and 8, the flexural compression strength is increased due to the limitation of the displacement of the front side rails 2 in the longitudinal direction.

Consequently, the flexural strength in the vertical direction is increased and the flexural strength of the kick-up portion K that acts as a plasticity hinge is reversed from the vertical direction (Mz) to a lateral direction (Mx), and therefore, the bending in the vertical direction is changed to bending in the lateral direction. (See FIG. 8). By doing so, the bent deforming displacement of the front portion 2F toward the rear direction can be limited, and at the same time, the absorbing rate of the collision energy can be increased.

Figure 9:
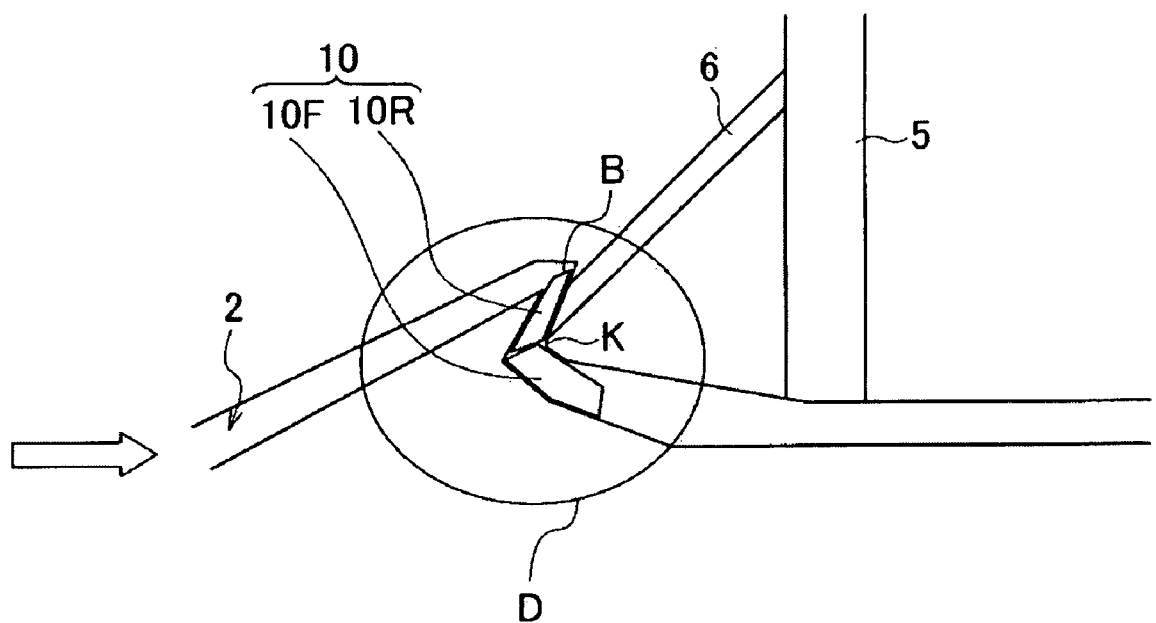
FIG. 9 is a plan view of the bent deforming guide member of FIGS. 4 to 8 in operation during the final period of a collision load application.
Figure 10:
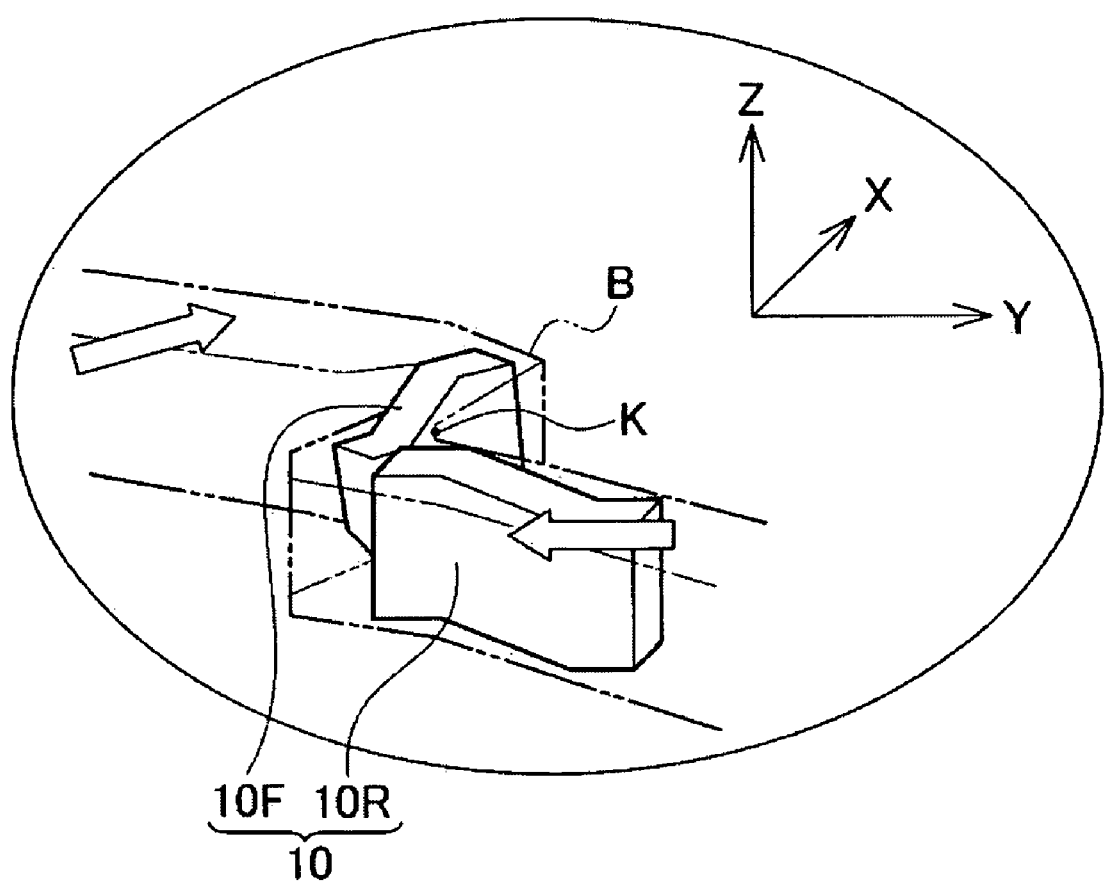
FIG. 10 is an enlarged perspective view of a portion D of FIG. 9.

In addition, as shown in FIGS. 9 and 10, when the kick-up portion K is bent in the lateral direction and the bending angle between the front guide member 10F and the rear guide member 10R increases, the cross-section at the front and back of the bending point is broken down and deformed. Nonetheless, the front and rear guide members 10F and 10R start supporting the cross-section in the broken down direction thereof (in the direction of bending) and thereby limit the bent deformation.

Therefore, a buckling point B is formed at a portion with a weak flexural strength relative to that of the front and rear guide members 10F and 10R; that is, the front and back of the front and rear guide members 10F and 10R, thereby increasing the absorption of the collision energy.

Since in the present embodiment, the diagonal bar 6 is provided on a portion corresponding to the rear guide member 10R, the front portion of the front guide member 10F becomes a portion with the least strength so as to form the buckling point B.

Therefore, in the body frame structure and the collision energy absorbing method according to the present embodiment, the front portion 2F of the front side rail 2 is bent and deformed upwardly around or at the kick-up portion during a frontal collision, and then the front portions 2F are bent and deformed in the lateral direction of the vehicle due to the collision of the front guide member 10F and the rear guide member 10R of the bent deforming guide members 10.

With the application of the bent deformation in the lateral direction of the vehicle, the bent deforming displacement of the front portion 2F in the rear direction can be limited, and at the same time, the amount of absorption of the collision energy can be increased.

In FIGS. 6, 8 and 10, X is the lateral direction, Y is the longitudinal direction and Z is the vertical direction of the vehicle.

In addition, in the present embodiment the bent deforming guide member 10 comprises the front guide member 10F and the rear guide member 10R, which are provided at the front and back around the vertical wall 9a of the dash panel 9, which is located approximately between the guide members. This precludes interference of the front portion 2F of the bent and deformed front side rail 2 with the dash panel 9.

Furthermore, the front guide member 10F and the rear guide member 10R are so configured as to be shifted relative to each other at the inner wall 2a and the outer wall 2b, of the front side rails 2, respectively, so that the front portion 2F of the front side rails 2 is securely bent and deformed toward the inside of the vehicle in the lateral direction when the front guide member 10F and the rear guide member 10R interfere with each other.

Still further, the front edge 6a of the diagonal bar 6 is connected to a portion of the front side rail 2 on which the rear guide member 10R is provided, and therefore the supporting reactive force of the rear guide member 10R is increased, thereby securely bending and deforming the front portion 2F of at least one of the front side rails 2. Also, as shown in FIG. 9, the bending and deforming of the front portion 2F can be limited to a certain extent, thereby precluding its interference with the dash panel 9.

In the present embodiment, the front guide member 10F and the rear guide member 10R of the bent deforming guide member 10 are provided at the front and back around the vertical wall position 9a of the dash panel 9, which is located between the guide members. On the other hand, the bent deforming guide member 10, that is, the front guide member 10F and the rear guide member 10R can be positioned in front of the vertical wall position 9a of the dash panel 9.

When the bent deforming guide member 10 is located in front of the vertical wall position 9a of the dash panel 9, the front portion 2F of at least one of the bent and deformed front side rails 2 also can avoid interfering with the dash panel 9.

In addition, in the present embodiment, the front guide member 10F and the rear guide member 10R comprise, as shown in FIG. 4, the projecting square U-shaped side wall 11 and the top seal plate 12 and the bottom seal plate 12a, respectively. As long as the front guide member 10F and rear guide member 10R have a strength capable of maintaining the collision load, they are acceptable. Therefore, these guide members 10F, 10R can also be structured as a box-type block material.

In addition, similar effects can be obtained when the positions of the front guide member 10F and the rear guide member 10R are reversed, that is, the front guide member 10F is fixed on the outer wall 2b of the front side rail 2 and the rear guide member 10R is fixed on the inner wall 2a of the front side rail 2, thereby bending and deforming the front portion 2F of the front side rails 2 outwardly in the lateral direction of the vehicle.

Figure 11:
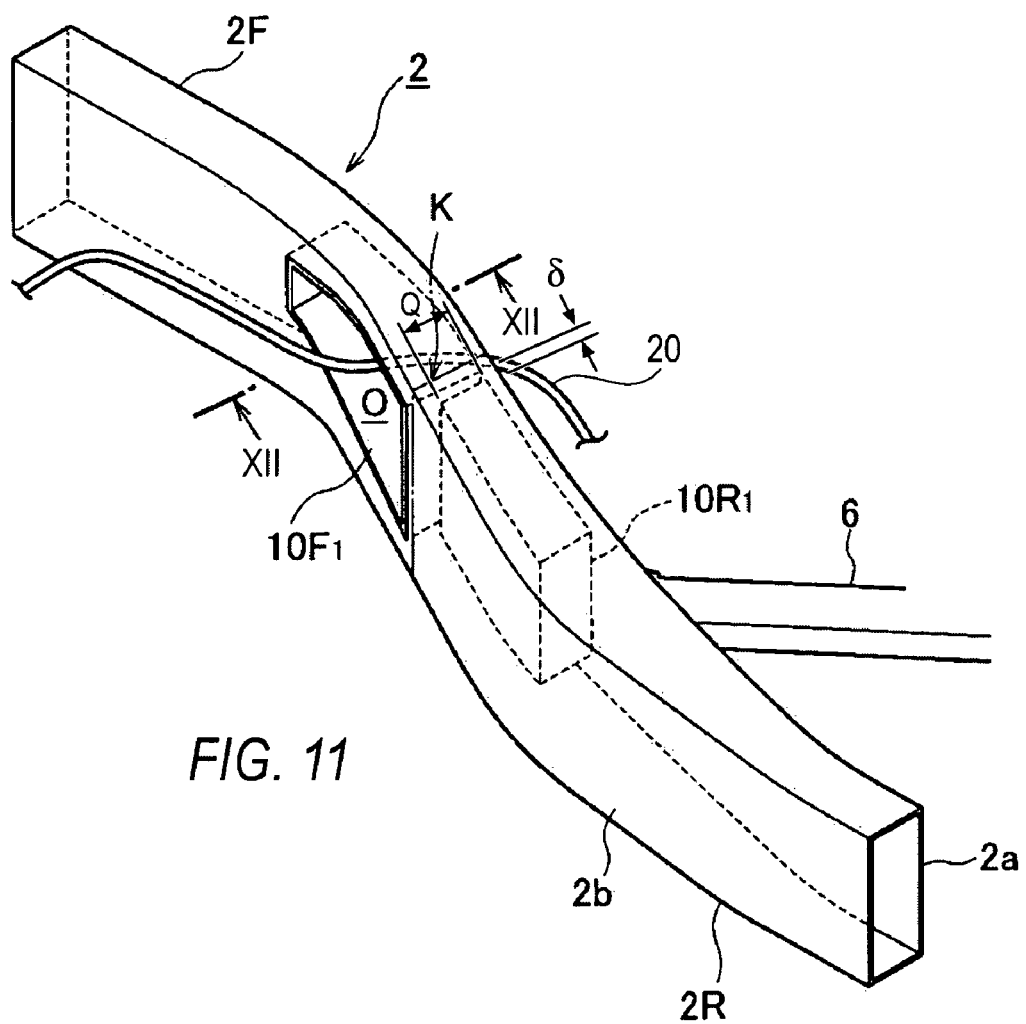
FIG. 11 is a perspective view of the portion A of FIG. 1, but showing a second embodiment.
Figure 12:
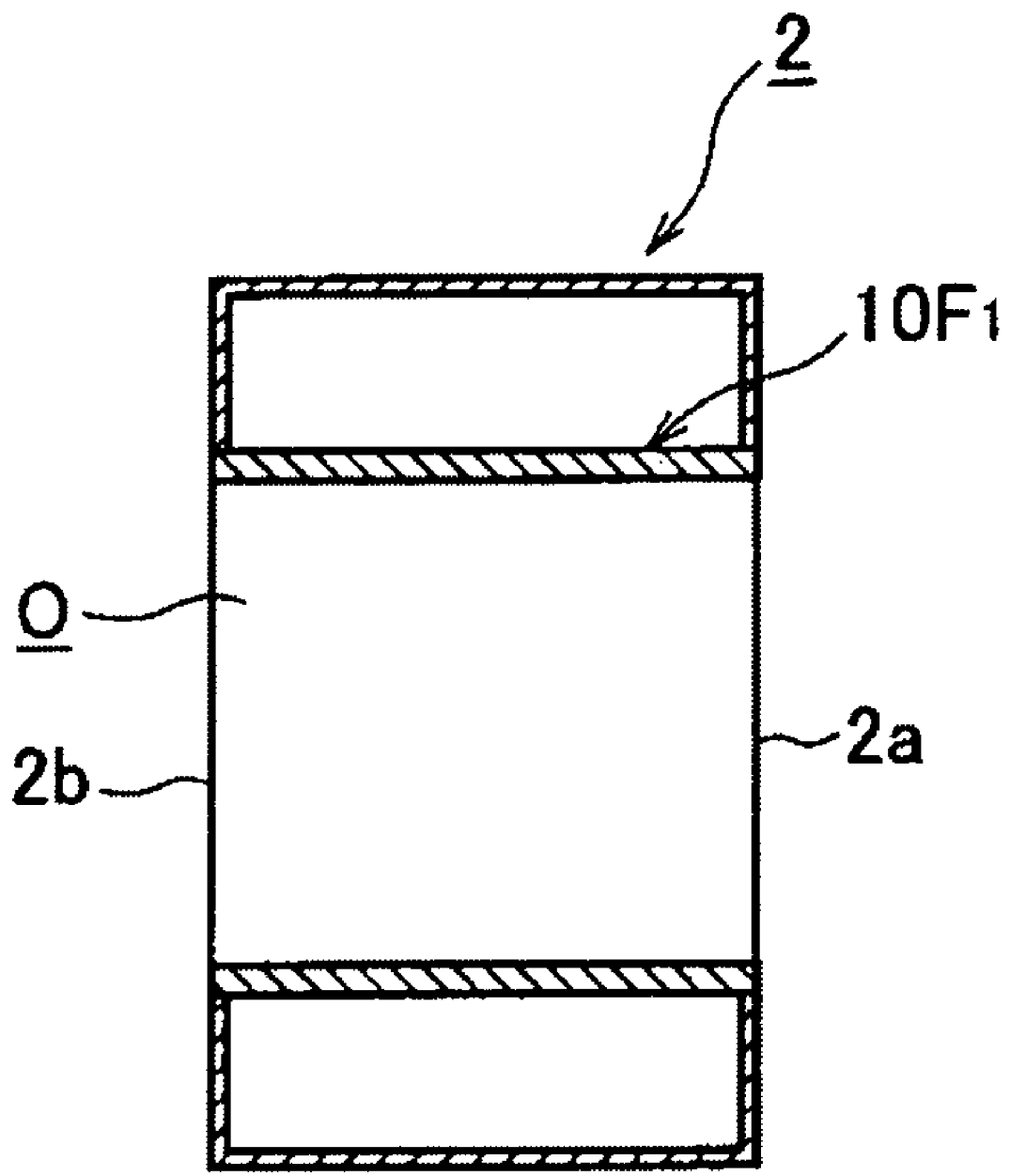
FIG. 12 is a cross-sectional view taken along line E-E of FIG. 11.

FIGS. 11 and 12 show a second embodiment. The same reference characters identify the same elements as in the above-described first embodiment and detailed descriptions thereof are omitted. FIG. 11 is a perspective view of the longitudinal frame member having a bent deforming member in the kick-up portion K. FIG. 12 is a cross sectional view taken along a line XII-XII in FIG. 11.

The body frame structure according to the present embodiment has, as shown in FIG. 11, basically, the same structure as the above-described first embodiment. A front guide member 10F1 and a rear guide member 10R1, as bent deforming members, are placed facing each other at a predetermined distance δ in the longitudinal direction of the vehicle and a predetermined overlapping portion Q is provided in the lateral direction of the vehicle. The guide members 10F1, 10R1 are placed in the closed cross-section S around the kick-up portion K of the front side rail 2, which is the longitudinal frame member.

When a load in the axial direction (the longitudinal direction) is applied to the front side rail 2 from the front edge during a frontal collision, the front portion 2F of the front side rail 2 is bent and deformed upwardly around the kick-up portion K, and then this front portion 2F is bent and deformed in the lateral direction of the vehicle due to the interference between the rear edge of the front guide member 10F1 and the front edge of the rear guide member 10R1.

Here, in the present embodiment, one of the front guide members 10F1 and the rear guide members 10R1, for example, the front guide member 10F1, has an open side structure with an opening O in a rectangular tube, in which both sides thereof in the lateral direction of the vehicle are open, and the front guide member 10F1 is installed so as to penetrate through the inner wall 2a and the outer wall 2b of the front side rail 2.

The open side peripheral border of the open side structure of the front guide member 10F1 is joined and fixed by using, for example, arc welding on circumferential edges of a through-hole of the inner side wall 2a and the outer side wall 2b of the front side rail 2.

Therefore, the inner wall 2a and the outer wall 2b of the front side rail 2 are connected by the front and back walls of the front guide member 10F1, and at the same time, the top and bottom walls of the front guide member 10F1 are connected to the inner wall 2a and the outer wall 2b so as to be apart from the top and bottom walls of the front side rail 2 at a predetermined interval.

In the body frame structure according to the present embodiment, not only the same effect can be obtained but also, when a variety of harnesses 20 such as pipes or wires are arranged to pass across the front side rail 2 and over the front compartment F/C and vehicle interior R, the harnesses 20 can be arranged in the lateral direction of the vehicle by putting them through the opening of the front guide member 10F1 thereby penetrating through the front side rail 2.

Conventionally, the harnesses 20 are arranged to pass between the top wall of the front side rail 2 and the floor panel 8 of the housing C and to pass across the front side rail 2 in the lateral direction of the vehicle. Compared to this, in the auto body structure according to the embodiment, by taking the ground interference into account, there is no risk that the harnesses 20 will be caught and damaged between the top wall of the front side rail 2 and the floor panel 8 of the housing C due to the deformation of the front side rail 2 as the result of a vehicle collision.

In addition, the space between the top wall of the front side rail and the floor panel 8 of the housing C can be minimized, thereby allowing easy design of housing C installation.

Further, in the present embodiment, as described above, the open side peripheral border of the front guide member 10F1 is joined and fixed to the circumferential edges of the through-holes of the inner wall 2a and the outer wall 2b of the front side rail 2. It has equal durability distribution on both the inner side wall 2a and the outer side wall 2b. In addition, front, back, top and bottom walls of the front guide member 10F1 are approximately perpendicularly joined to the inner wall 2a and the outer wall 2b, and therefore the crushing rigidity of the front side rail 2 where the front guide member 10F1 is provided is increased. In particular, the rigidity of the front side rail 2 in the lateral direction of the vehicle is increased due to the multi-step wall structure with the top and bottom walls of the front side rail 2 and top and bottom wall of the front guide member 10F1. Consequently, not only the bending reaction force in the vertical direction around the kick-up portion K of the front side rail can be improved, but also the bending deformation limitation of the front portion 2F of the front side rail 2, and energy absorption can be increased.

Further, another buckling point where the front side rail 2 is bent and deformed during a vehicle collision is formed on the front edge of the front guide member 10F1, in addition to the above-mentioned kick-up portion K, thereby allowing secure regulation of the vertical bending deformation and the lateral bending deformation of the front side rail 2.

Figure 13:
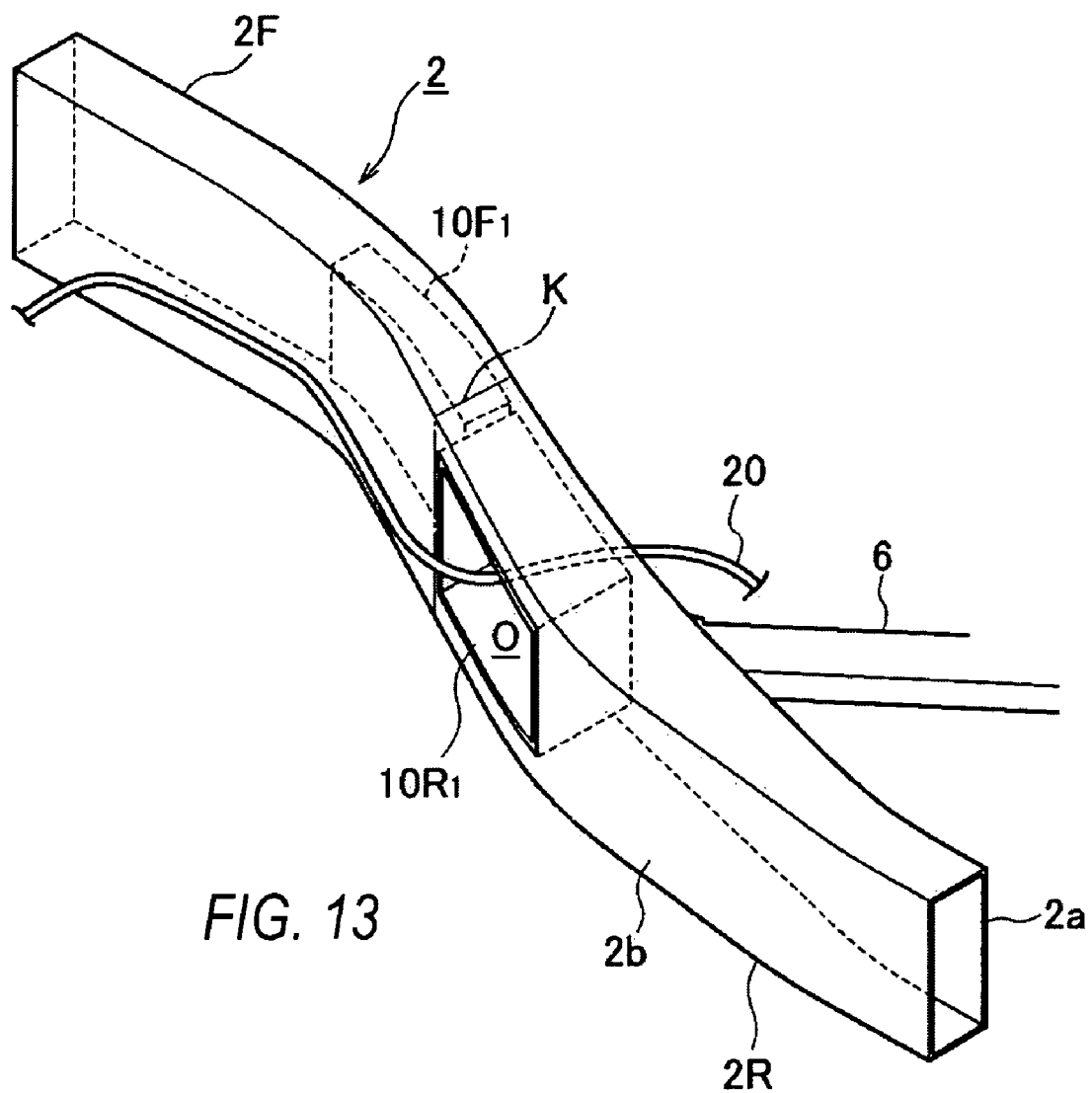
FIG. 13 is a view similar to FIG. 11, but showing a third embodiment.

FIG. 13 shows a third embodiment. Unlike the second embodiment, the third embodiment has a side portion structure having a rectangular tube shaped opening O on both sides of the rear guide member 10R in the lateral direction of the vehicle. The above-mentioned rear guide member 10R1 is installed so as to penetrate through the inner wall 2a and the outer wall 2b of the front side rail 2.

Therefore, in the body frame structure of the third embodiment most of the same effects of the second embodiment can be obtained.

Figure 14:
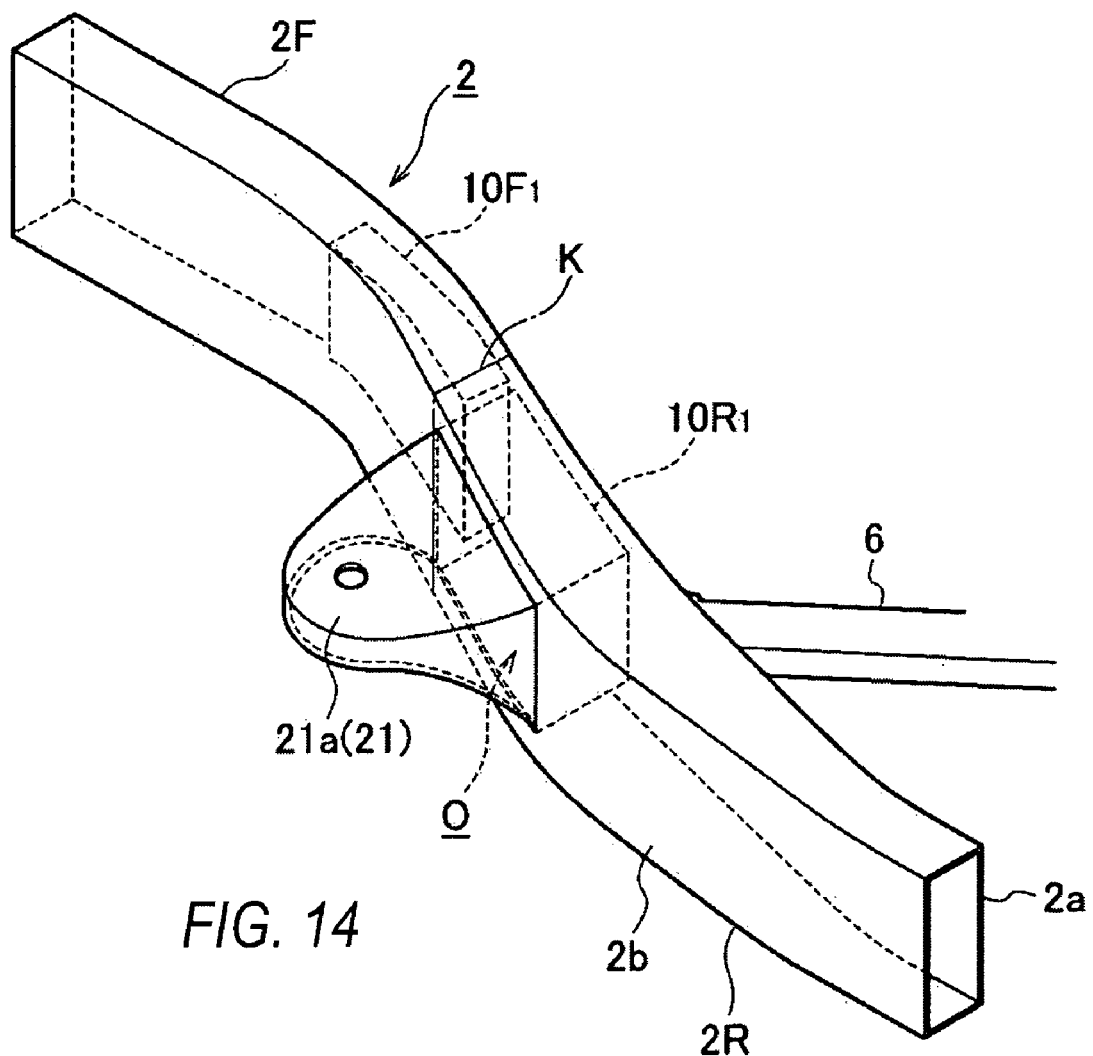
FIG. 14 is a view similar to FIGS. 11 and 13, but showing a fourth embodiment.

FIG. 14 shows a fourth embodiment. The body frame structure according to the present embodiment is basically the same as that of the third embodiment. It has a rectangular tube-type open side structure with an opening O, in which both sides of the rear guide member 10R1 in the lateral direction of the vehicle are open.

The rear guide members 10R1 are installed so as to penetrate through the inner side wall 2a and the outer side wall 2b of the front side rail 2.

Also, a bracket 21 for attaching one or more members) is provided on the open side edge portion of the rear guide member 10R1 and projects in the lateral direction of the vehicle.

In the present embodiment, a housing mounting bracket 21a serves as the bracket 21 for attaching a member. The housing mounting bracket 21a projects in the lateral direction of the vehicle, extending to the outside of the opening in the lateral direction of the vehicle from the rear guide member 10R1 so that the housing C (see FIG. 3) may be connected thereto and supported thereon.

Therefore, the body frame structure of the fourth embodiment can obtain most of the same effects of the second embodiment, and in addition, it contributes to cost reduction because a separate housing mounting bracket for mounting only the housing is not required. Furthermore, since durability of a portion where the rear guide member 10R1 of the front side rail 2 is high, the supporting durability of the housing C can be increased.

Figure 15:
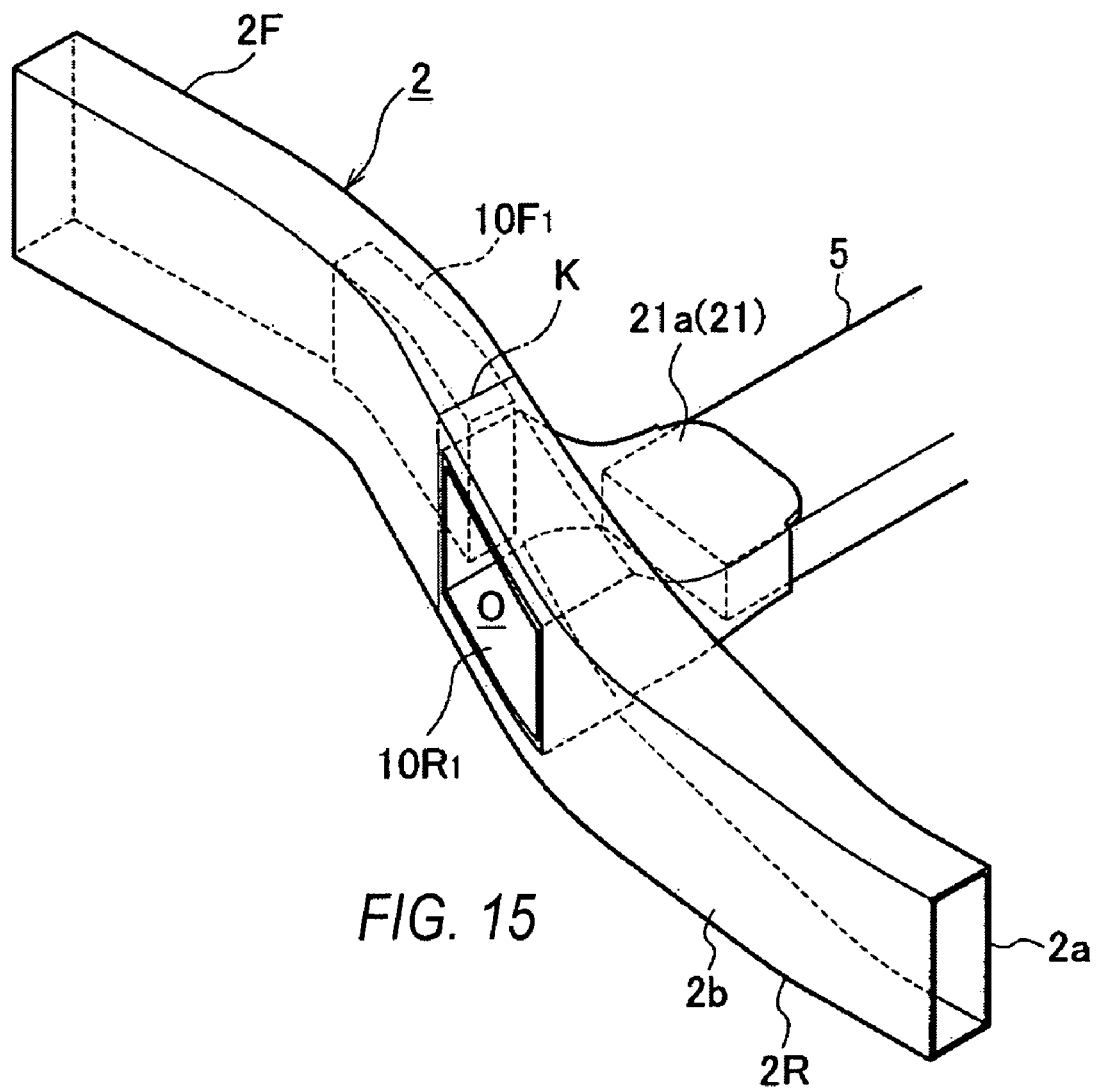
FIG. 15 is a view similar to FIG. 14, but showing a modified form of the fourth embodiment.

FIG. 15 shows a modified example of the fourth embodiment. In this body frame structure, a cross member mounting bracket 21b serves as the bracket 21 for attaching a member that is projected inwardly. The cross member mounting bracket 21b extends from the open portion of the rear guide member 10R1 in the inner lateral side of the vehicle. Also, a transmission cross member is connected to the cross member mounting bracket 21b.

Therefore, this modified example also does not require a separate cross member mounting bracket for mounting only a bracket, thereby reducing cost, and at the same time, the supporting durability of the transmission cross member 5 can be increased.

The bracket 21 for attaching a member can be provided on the open side edge portion of the front guide member 10F1 in the second embodiment that is shown in FIG. 11.

In the above embodiments, although the bent deforming member provided in one of the front side rails is described, the bent deforming member may be provided in each of the side rails. Thus, a number of advantages are provided.

Although only some exemplary embodiments have been described in detail above, those skilled in the art will readily appreciate that many modifications are possible in the exemplary embodiments without materially departing from the novel teachings and advantages. Accordingly, all such modifications are intended to be included within the scope.

Moreover, the body frame structure is described in connection with the above-mentioned embodiments; however, it is not limited to these embodiments and a variety of embodiments can be applied within the extent that they do not deviate from the scope. For example, in addition to the body frame structure 1 of the frame type vehicle, the disclosed technology can be applied to any vehicle as long as it has a longitudinal frame member on at least one side in the lateral direction of the vehicle. The technology can be applied to, for example, the front side member of a unitized body auto body.

What is claimed is:

1. A body frame structure for a vehicle comprising:
   a longitudinal frame member having a front portion, a rear portion, and a kick-up portion, such that said front portion and said rear portion are offset relative to each other in a vertical direction around said kick-up portion;
   said front portion being bent and deformed upwardly around said kick-up portion when a collision load is selectively applied to said longitudinal frame member; and
   a bent deforming guide member located within said longitudinal frame member adjacent to said kick-up portion to at least partially constrain said front portion of said longitudinal frame member to bend and deform in a lateral direction of the vehicle when said collision load is selectively applied in the form of an applied frontal collision load.

2. The body frame structure according to claim 1, wherein said bent deforming member comprises a front guide member and a rear guide member, and said front guide member and said rear guide member are located adjacent to each other in front and rear sides of a portion of a dash panel of the vehicle.

3. The body frame structure according to claim 1, wherein said bent deforming member is located on a front side of said portion of the dash panel.

4. The body frame structure according to claim 1, wherein said bent deforming member comprises a front guide member and a rear guide member offset relative to each other on an inner wall and an external wall of said longitudinal frame member, respectively.

5. The body frame structure according to claim 4, including a diagonally extending bar having a front edge thereof connected to a portion of said body frame structure where said rear guide member of said longitudinal frame structure is located.

6. The body frame structure according to claim 1, wherein at least one of said front guide member and said rear guide member has an opening in the lateral direction of the vehicle, and said opening penetrates through at least one of an outer wall and an inner wall of said longitudinal frame member.

7. The body frame structure according to claim 6, wherein side open circumferential edges of said at least one of said front guide member and said rear guide member are fixed to edges of a through-hole of said outer wall and said inner wall, respectively.

8. The body frame structure according to claim 6, wherein a bracket projecting in the lateral direction of the vehicle, to which a member is attached, is located in said side open circumferential edge of one of said front guide member and said rear guide member.

9. The body frame structure according to claim 7, wherein a bracket projecting in the lateral direction of the vehicle, to which a member is attached, is located in said side open circumferential edge of one of said front guide member and said rear guide member.

10. A collision energy absorbing method using a body frame structure including a longitudinal frame member, the method comprising:
    selectively bending and deforming a front portion of said longitudinal frame member upwardly around a kick-up portion of said longitudinal frame member when a collision load is applied to said longitudinal frame member, said longitudinal frame member including said front portion, a rear portion and said kick-up portion, such that said front portion and said rear portion are offset relative to each other in a vertical direction around said kick-up portion; and
    using a bent deforming guide member located inside said longitudinal frame member adjacent to said kick-up portion to selectively constrain said front portion to bending and deforming in a lateral direction of the vehicle during an applied frontal collision load.

11. A longitudinal frame member assembly for a vehicle, comprising:
    a longitudinal frame member having a front portion and a rear portion that are offset relative to each other in a vertical direction; and
    a front guide member and a rear guide member located inside said longitudinal frame member, whereby said front portion is selectively bent and deformed in a lateral direction of said vehicle by colliding said guide members with each other when a frontal collision load is applied to the longitudinal frame member.

* * * * *